United States Patent [19]

Runyon

[11] 4,111,574

[45] Sep. 5, 1978

[54] HINGE JOINT ASSEMBLY

[76] Inventor: John F. Runyon, 91 Kent St., St. Paul, Minn. 55102

[21] Appl. No.: 744,984

[22] Filed: Nov. 26, 1976

Related U.S. Application Data

[63] Continuation-in-part of Ser. No. 397,765, Sep. 17, 1973, Pat. No. 4,074,477.

[51] Int. Cl.² .............................. E04B 1/32; F16D 3/00
[52] U.S. Cl. ......................................... 403/54; 52/86; 403/58; 403/62
[58] Field of Search ................. 52/86; 403/54, 57, 58, 403/62, 74; 64/1 C, 6, 16, 17 R, 17 SP, 19

[56] References Cited

U.S. PATENT DOCUMENTS

| 430,597 | 6/1890 | Westover | 64/19 |
| 1,185,199 | 5/1916 | Hauer | 64/17 SP |
| 1,284,984 | 11/1918 | Barnes | 64/17 SP |

FOREIGN PATENT DOCUMENTS

| 25,503 | 11/1922 | France | 403/57 |
| 391,127 | 4/1933 | United Kingdom | 64/17 SP |

OTHER PUBLICATIONS

French 25,503 is the first addition of French 518,365.

Primary Examiner—James L. Ridgill, Jr.
Attorney, Agent, or Firm—Burd, Braddock & Bartz

[57] ABSTRACT

A hinge joint assembly for flexibly connecting rigid structural components in the construction of modular buildings. More specifically, the joint permits the fastening of struts (rods, tubes, or the like) and/or panel studs with three possible degrees of rotational freedom for each strut or stud connected. Each joint assembly includes a plurality of interacting fastening units having a connecting member to which a longitudinally extending strut or stud is rotatably connected about its longitudinal axis, the connecting member in turn being rotatable about either of two axes which are perpendicular to each other and to the longitudinal axis of the strut or stud. Several forms of joint assembly are shown and described.

15 Claims, 13 Drawing Figures

U.S. Patent   Sept. 5, 1978   Sheet 1 of 2   4,111,574
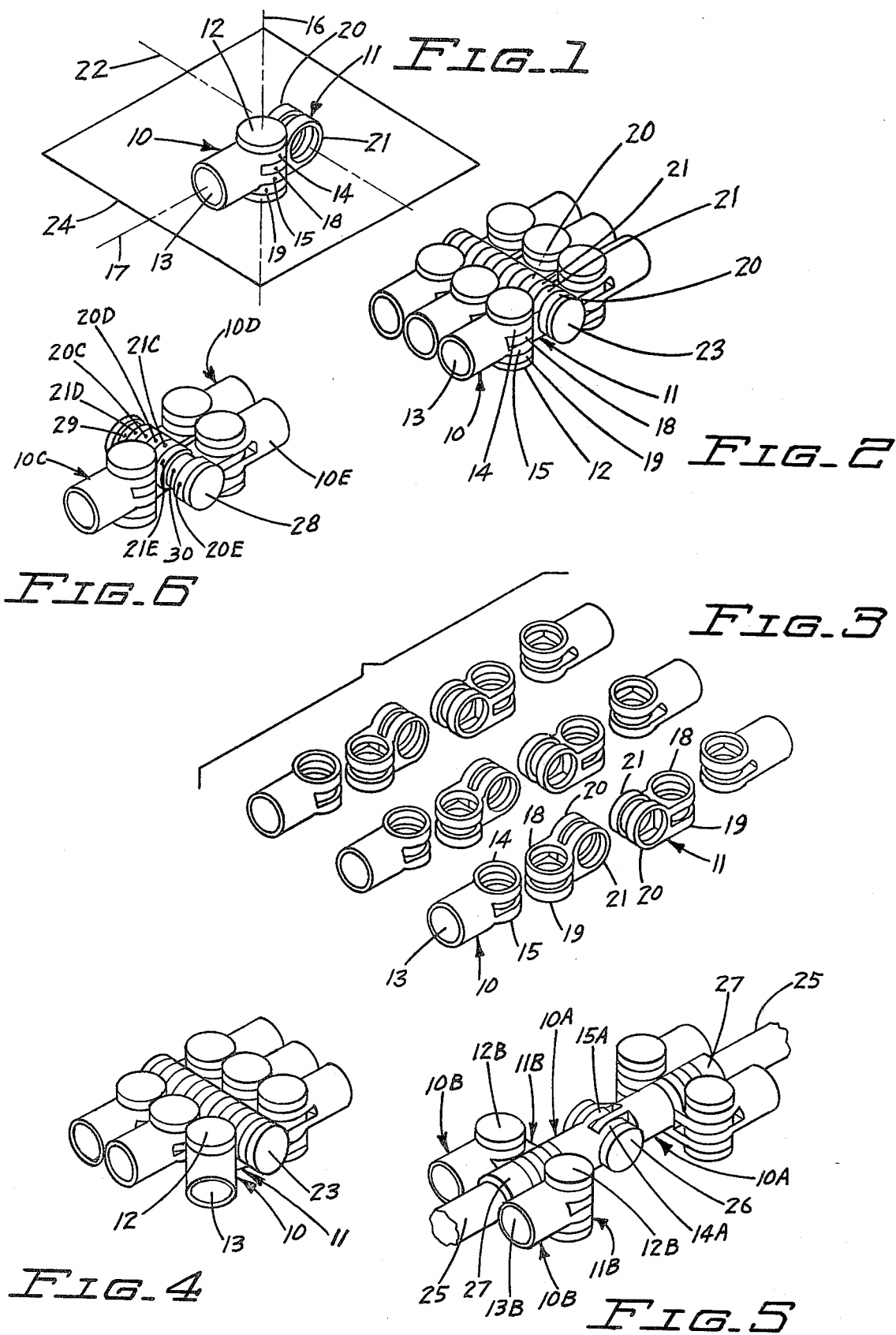

HINGE JOINT ASSEMBLY

This invention relates to a hinge joint assembly for flexibly connecting rigid structural components in the construction of modular buildings, such as those shown and described in my copending application Ser. No. 397,765, filed Sept. 17, 1973. Those building structures are formed from repeating alternating mirror-image forms of basic mathematically determinate structural modules. The structural modules are foldable. The joint assembly of the present invention permits the fastening of structural components such as struts (rods, tubes, or the like) and/or panels having projecting studs with three possible degrees of rotational freedom for each strut or stud connected. The joint assembly includes a plurality of flexibly interacting fastening units mounted for rotation about a common hinge pin. Each fastening unit includes a connecting member capable of rotatably engaging one end of a strut or a stud for rotation about the longitudinal axis of the strut or stud. The fastening units also include intermediate mounting means engaging both the connecting member and the hinge pin, capable of rotating about the hinge pin and also capable of pivoting on a third axis perpendicular to both the axes of the hinge pin and the connecting member.

Cook U.S. Pat. No. 3,148,539 discloses an ideal spherical hinge for the construction of an analytical frame structure for the study of the behavior of the structure under applied loads and the effect of pressures on the structural members. However, the Cook invention is related to relatively small lightweight models as opposed to full scale architectural structures, such as those of applicant. Accordingly, the Cook hinges are composed of resilient plastic material and flexing of the structure is the result of flexing of the resilient plastic joints. In contrast, the joint assemblies according to applicant's invention are formed of rigid non-resilient materials and flexing of the joint is the result of relative pivotal motion between the rigid non-resilient components of the joint assembly.

The invention is illustrated in the accompanying drawings in which:

FIG. 1 is an isometric view of one form of basic fastening unit;

FIG. 2 shows a compound hinge assembly composed of six fastening units assembled on a common hinge pin;

FIG. 3 shows the elements making up the joint assembly of FIG. 2 in exploded view with pins removed;

FIG. 4 shows a compound hinge joint assembly as in FIG. 2, with the connecting member of one fastening unit pivoted about 45° in one direction;

FIG. 5 shows a modified form of compound hinge joint assembly;

FIG. 6 shows a still further form of compound hinge joint assembly;

Figure 7:
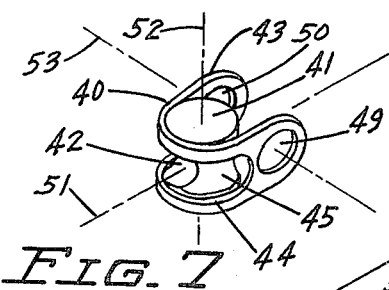
FIG. 7 shows a different form of basic fastening unit.
Figures 8, 9:
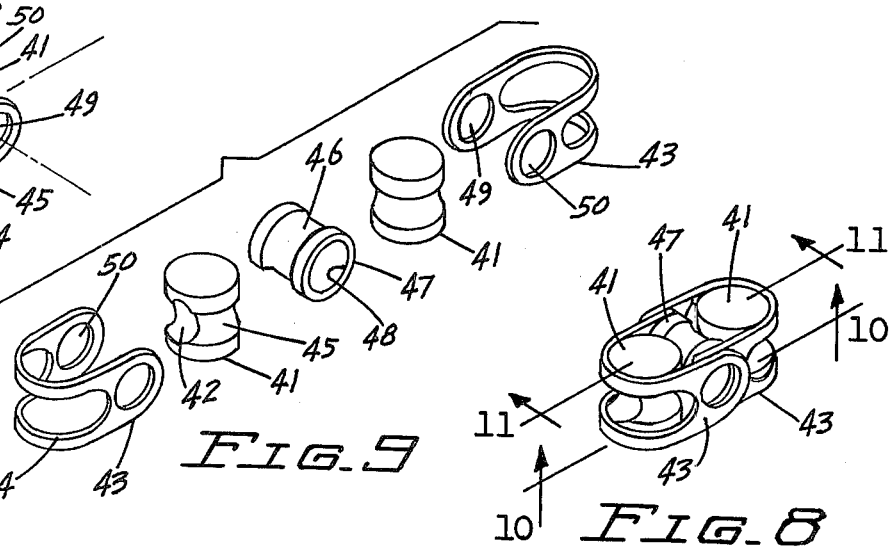
FIG. 8 shows a compound joint assembly having two fastening units, without the hinge pin.
FIG. 9 shows the assembly of FIG. 8 in exploded view.

Referring now to the drawings, in FIG. 1 there is shown a basic hinge joint assembly fastening unit composed of three elements, a connecting member 10, intermediate mounting means, or skew axes element 11 and a capped pin 12. Connecting member 10 includes a socket 13 capable of receiving one end of a rigid strut, which may be in the form of a rod or a tube, or it may receive the end of a panel stud which may be in the form of a short rod or tube. The connecting member includes a pair of spaced apart rings 14 and 15 which are concentric and of equal size and disposed about an axis 16 which is perpendicular to the longitudinal axis 17 of socket 13. The inside diameters of socket 13 and rings 14 and 15 are desirably the same. Socket 13 may be internally threaded to receive the externally threaded end of a strut. Alternatively, a tubular strut may engage the outside of the socket housing, which may then be a smaller diameter and externally threaded to engage the internally threaded tubular strut. Such a socket housing must be made smaller to go inside a strut so that the struts are no wider than the other elements.

Intermediate mounting means 11 is a skew axis element which comprises one pair of spaced apart concentric equally sized rings 18 and 19 disposed about one axis and a similar pair of rings 20 and 21 in edge to edge relation disposed about an axis perpendicularly skew to that of rings 18 and 19. The skew axes are displaced by about one ring diameter. Rings 14 and 15 and 18 and 19 are of equal width and are equally spaced apart such that the rings of connecting member 10 engage and mesh with those of intermediate means 11 and the members are joined to permit pivoting about axis 16 by virtue of pin 12.

Two or more fastening units, as shown in FIG. 1, can be joined together for rotation around a common axis 22 by intermeshing the rings 20 and 21 of two intermediate skew axes mounting means 11 and inserting a common central hinge pin 23 through those rings, as shown in FIG. 2 where six fastening units are mounted on a single hinge pin. It will be seen that the assembled fastening units provide two perpendicular axes of rotation for each strut, the axis 16 of the individual hinge pins 12 and the axis 22 of the common central hinge pin 23. The third perpendicular axis 17 is provided by sockets 13 which hold the struts and studs in the joint, but allow them to rotate about their own axes.

Axes 17 and 22 lie in reference plane 24 shown in FIG. 1. Axis 16 perpendicularly intersects axis 17 and is perpendicularly skew to axis 22. All three axes do not meet at a common point because axis 22 is separated from the intersection of axes 16 and 17 by the distance between the center of rings 18 and 19 on the one hand, and the center of rings 20 and 21 on the other, a distance approximately equal to the diameters of those rings. This is beneficial because it allows greater rotational travel of the connected members and in addition serves to counteract some of the eccentricities introduced when a joint assembly is constructed with more than two basic fastening units, such as in FIG. 2. The joint assembly of FIG. 2 is adapted for connecting six structural components, a strut or stud being received into each of sockets 13.

To transmit forces with no eccentricities at the joint, the directions of every applied force (which here are the directions of the axes 17 of the sockets 13) must intersect at a common point. Usually this point is the joint assembly center which is the mid-point of center hinge pin 23. The joint assembly shown approaches this ideal by requiring all axes 17 of sockets 13 to intersect a common line, namely the hinge pin axis 22. The axes of the two middle sockets intersect the center pin mid-point while the four outer socket axes intersect the center pin axis at a distance only about one pin diameter from the mid-point. As the four outer sockets pivot about pins 12 to form an angle less than 90° between the socket axes and the center pin axis, the socket axes move to intersect closer to the center pin mid-point, reducing the eccentricities of forces applied to the joint.

FIG. 4 shows the compound joint assembly of FIG. 2 in which one of the four outer connecting members 10 with its socket 13 is pivoted about pin 12 to form an angle of about 45° with the center hinge pin 23, an "average" orientation half way betweeen 90° and 0°. The connecting member is linked to the hinge pin by the intermediate skew axes means 11 which is located eccentric from the joint assembly mid-point by a distance approximating one diameter along the hinge pin axis. The axes of intermediate member 11 are skew by roughly one diamter also, providing a second eccentricity perpendicular to the first. With the socket in the "average" 45° orientation described, these two eccentricities cancel because the force applied by a member is along the socket axis and thus directed at the joint assembly center. In general, the eccentricity built into intermediate skew axis mounting members 11 helps to counteract an unavoidable eccentricity introduced by the location of all but two of the skew axis mounting means away from the joint assembly center.

It is desirable that the inside diameters of sockets 13, rings 14, 15, 18, 19, 20 and 21 and the outside diameters of hinge pins 12 and 23 and the struts to be inserted into the sockets all be generally the same. FIG. 5 shows a compound joint assembly in which the ends of a pair of round struts 25 substitute for center hinge pins. The two middle connecting members 10A are connected together by intermeshing their rings 14A and 15A and securing together by a common hinge pin 26. (Elements 10A, 10B, 11B, 14A, 15A, etc. are structurally identical to elements 10, 11, 12, 14, 15, etc., but are designated to distinguish the different structural assemblages in which they appear.) One end of a strut 25 is inserted into each of their sockets. Two additional fastening units, each composed of a connecting member 10B and an intermediate skew axis mounting member 11B are mounted on the end of each strut 25 with the strut passing through rings 20 and 21 of the mounting members before being inserted into the sockets of middle connecting members 10A.

Because the two middle connecting members 10A of this joint assembly are connected directly to each other and hinge pin 26, omitting the intermediate skew mounting member, two rotational degrees of freedom are lost. Thus, the axis of hinge pin 26 will always be perpendicular to the plane containing the axes of the sockets of those middle connecting members when they are not colinear. The struts whose ends are inserted in the sockets of middle connecting members 10A act as hinge pins for the remaining fastening units 10B which are retained by collars 27. Again the eccentricities counteract.

An outer socket 13B rotated about its pin 12B to an "average" angle will direct force along its axis and close to the joint assembly center. Common hinge pin 26 is the same length as hinge pins 12B since it connects only two members. The joint assembly can receive the ends of four additional struts for a total of six and thus could replace the joint assembly shown in FIG. 2. The two missing rotational degrees of freedom are unnecessary when the joint assembly is considered as a whole, since the joint assembly of FIG. 2 contains two redundant degrees of freedom which could be removed by mounting the middle connecting members 10 directly to the center hinge pin eliminating two intermediate skew axis mounting means 11. Note that hinge pin 26 could be replaced by a further strut 25 and the hinge joint assembly could be mounted at any location along the length of a strut member.

FIG. 6 shows a further compound joint assembly designed to connect an odd number (three) of struts or studs. For the purpose of illustration, center hinge pin 28 is shown as long enough to connect an even number (four) of fastening units. As shown, because one intermediate basic fastening unit has been omitted, its missing intermediate skew axis mounting means leaves two spaces along the pin. Remaining connecting member 10C on that side has been shifted two rings toward the joint assembly center, leaving one space 29 adjacent the far cap of hinge pin 28 and another space 30 one ring away from the near hinge pin cap. This shift, equal to about one-half diameter along the hinge pin, allows the forces of the structural components received by the sockets of the three basic fastening units to be more evenly centered on the joint. If four basic fastening units were used, the eight rings of the four units would completely fill the spaces along the pin. With three basic units a spacer and shorter pin would be used to eliminate the spaces.

This joint also contains two redundant rotational degrees of freedom because a complete basic fastening unit has been used for each member to be connected to the joint assembly. Whether these redundancies should be eliminated, and if so, by what means, (for example, by eliminating certain joint assembly elements or by rigidly locking them to another joint assembly element or structural component) should be determined by considering the relation of all joint assemblies and structural components in a total structure. For example, consider a tubular strut retained in a joint socket at each end. So long as one end is free to rotate in its socket, the rotational freedom of the other socket about the strut axis is immaterial since the two sockets are free to rotate with respect to each other about the strut axis.

Referring now to FIG. 7, there is shown a modified form of basic fastening unit, indicated generally at 40, and composed of a connecting member 41 having a socket 42 adapted to receive the end of a strut or stud, and intermediate skew axes mounting means in the form of a U-shaped strap or band 43 adapted to partially encircle the connecting member 41 and mount it on a hinge pin. The width of strap or band 43 corresponds generally to the height of member 41 which in turn corresponds generally to about 1⅓ times the diameter of that member. Strap or band 43 is provided with a central elongated slot opening 44 through which a strut or stud extends into socket 42. The inside radius of curvature of band 43 is generally the same as the outside radius of member 41 so that the inside surface of band 43 functions as a busing for member 41 when rotated.

Member 41 is provided with a central shallow concave recess 45 extending around member 41 (best seen in FIG. 11) and adapted to mate with a similar deep concave mid-section 46 of spool-like element 47 (best shown in FIG. 10) having an axial opening 48 adapted to receive a hinge pin. The open ends of U-shaped band 43 have holes 49 and 50 of diameter corresponding to that of passage 48 to receive a hinge pin. The width of slot 44 and diameter of socket 42 are generally the same as the hinge pin diameter. If the hinge pin and socket have a diameter $d$, then the diameter of member 41 is about 1-½ d, its length is about 2 $d$, the socket depth is about d and the depth of recess 45 is about 1/20 $d$. Spool member 47 has a length and outside diameter of about 2 $d$ and the depth of recess 46 is about 2/5 $d$.

A simple hinge joint assembly composed of two basic fastening units with hinge pin removed is shown in FIGS. 8 through 11. This compound hinge joint assembly is adapted to connect two struts or studs to a single central hinge pin, or strut functioning as a hinge pin, extending through holes 49 and 50 of two bands 43 and passage 48 of spool member 47.

It will be seen that the connecting member 41 defines a pair of intersecting perpendicular axes, axis 51 (FIG. 7) being the longitudinal axis of socket 42 and any strut or stud inserted into that socket, and axis 52 being the longitudinal axis of rotation of member 41. Band 43 defines a pair of skew perpendicular axes, axis 52 which is the axis of rotation of member 41 in the assembled unit and axis 53 being the axis of the hinge pin. Axes 51 and 53 lie in the same plane. The skew axes of band means 43 are about one diameter apart. The relations of all axes to one another are the same as described in conjunction with FIG. 1.

The width of slot opening 44, the diameter of socket 42, the diameters of holes 49 and 50, the diameter of passage 48, and the outside diameter of any strut or stud used in conjunction with the hinge joint assembly should desirably be generally the same. Socket 42 should desirably be internally threaded to receive an externally threaded strut or stud.

To make a compound joint assembly capable of connecting six struts or studs, two additional pairs of basic fastening units 40 are joined along a common axis 53 of a single long center hinge pin. This joint assembly would be functionally identical to the hinge joint assembly of FIG. 2 but easier to manufacture because of the lesser complexity of its component parts. The basic fastening unit of FIG. 7 may be substituted for those of FIG. 1 in the assemblies of FIGS. 2, 4, 5 and 6 except that it will not center an odd number of structural components, as will the assembly of FIG. 6.

Spool member 47 is not essential, but it improves the ability of connecting member 41 to transmit compressive forces from a structural component occupying axis 51 to a hinge pin or other round member occupying axis 53.

Figure 10:
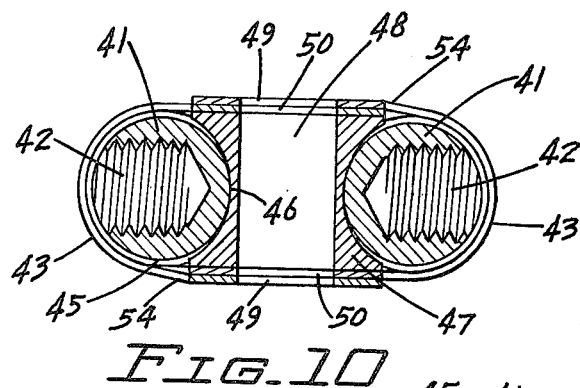
FIG. 10 is a section generally on the line 10—10 of FIG. 8 and in the direction of the arrows.
Figure 11:
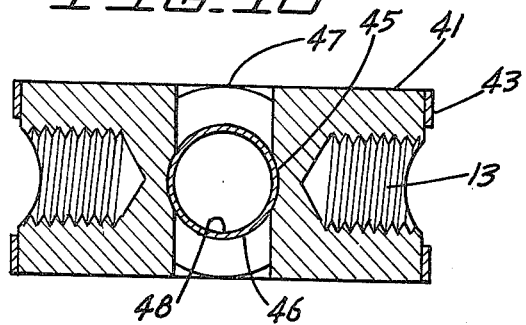
FIG. 11 is a section on the line 11—11 of FIG. 8 and in the direction of the arrows.
Figure 12:
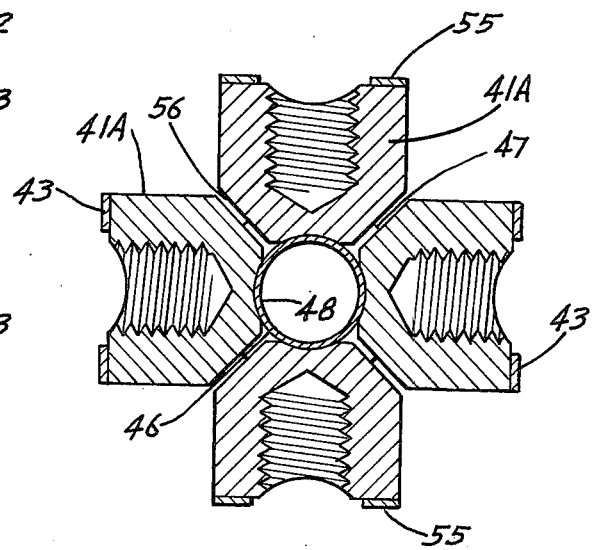
FIG. 12 is a sectional view similar to FIG. 11 but showing a compound joint assembly having four fastening units.

As best seen in FIG. 10, the ends of bands 43 are able to pass by each other at the ends of spool member 47 because of a slight offset 54, equal to one thickness of the material from which the band is formed, which is built into one side of the band element. If the band element is made with an offset of two material thicknesses on one side and three material thicknesses on the other, then two of these new band elements 55 can be fitted over the ends of a spool member 47, in addition to the two band elements 43 already in place, as used in FIG. 12 which is a section through such an assembly. In order to fit four members 41A about a single spool member 47, material must be removed from the corners of member 41, as shown at 56 on the side opposite from the socket opening. As is apparent, a center pin through passage 48 in spool member 47 and through the end holes of the band elements 43 and 55 would be necessary to complete the assembly. This assembly allows the connection of more structural components, as compared with the assembly of FIG. 11, but with decreased rotational movement about the hinge pin axis 53.

Figure 13:
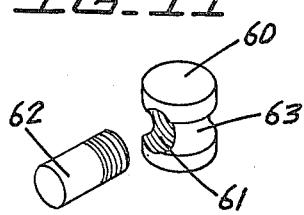
FIG. 13 shows in exploded view a modified form of hinge joint component for connecting tubular elements.

In FIG. 13, there is shown an alternative form of connecting member 60 corresponding generally to member 41 having a socket 61 adapted to receive a plug or stud 62. Plug or stud 62 is adapted to fit into socket 61 and is adapted to engage the end of a tubular strut or stud. Alternatively, a tubular strut or stud may be inserted directly into socket 61 (or socket 42 of member 41). The members are desirably appropriately threaded so as to permit a strut or stud to be connected to the hinge assembly, free to rotate about its longitudinal axis but fixed against longitudinal movement out of disengagement with the connecting member. Member 63 is likewise provided with an annular shallow recess.

In each instance, the center hinge pin is shown or described as an independent straight cylindrical element. In some instances, as at the base of a building structure, it might be fixed in space, as a foundation stud or the like. In other instances, as at the top of a dome where it might be desired to connect a large number of structural components, the fastening units may be mounted on a ring forming a circular hinge, but each increment mounting a fastening unit deviating but slightly from a straight line.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A hinge joint assembly composed of non-resilient material for flexibly connecting a plurality of at least three structural building components in the construction of modular buildings, said hinge joint assembly comprising:
   (A) at least one hinge pin, and
   (B) a plurality of similar flexibly interacting fastening units mounted for rotation about said hinge pin and each including:
      (1) at least three rotatable connecting members each having means for loosely and rotatably engaging a longitudinally extending rigid structural component for rotation about the longitudinal axis of the component, said longitudinal axis extending perpendicular to the axis of rotation of the connecting member, and
      (2) a corresponding number of intermediate means mounted on said hinge pin and engaging said connecting member for securing said connecting member to said hinge pin, said connecting member being in fixed engagement with said intermediate means for pivotal movement of said connecting member about said hinge pin, and in rotatable engagement with said intermediate means for rotational movement relative thereto about an axis perpendicular to the axes of said pin and structural component and skew relative to the axis of the pin.

2. A hinge joint assembly according to claim 1 further characterized in that:

(A) said joint assembly includes a plurality of hinge pins,
(B) at least one of said hinge pins is an elongated cylindrical structural component engaged by the joint assembly, and
(C) additional fastening units are mounted for rotation about the longitudinal axis of said structural component.

3. A hinge joint assembly according to claim 1 further characterized in that said means for rotatably engaging a structural component comprises a cylindrical socket coaxial with said component and adapted to receive an end of said component.

4. A hinge joint assembly according to claim 3 further characterized in that said socket is internally threaded.

5. A hinge joint assembly according to claim 1 further characterized in that said means for rotatably engaging a structural component comprises a cylindrical plug coaxial with said component and adapted to be received into a cylindrical recess in the end of said component.

6. A hinge joint assembly according to claim 5 further characterized in that said plug is externally threaded.

7. A hinge joint assembly according to claim 1 further characterized in that:
(A) said intermediate mounting means comprises a first plurality of spaced apart concentric rings of equal size disposed about the axis of said hinge pin and in engagement with said pin, and a second plurality of spaced apart concentric rings of equal size connected to said first rings in edge to edge relation and disposed about an axis perpendicularly skew to the axis of the hinge pin,
(B) said connecting member includes a third plurality of spaced apart concentric rings of size and spacing equal to the second spaced apart rings of said intermediate means and in engagement therewith about a common axis, and
(C) a further pin extends through said second and third rings.

8. A hinge joint assembly according to claim 7 further characterized in that said first plurality of rings of one fastening unit are in concentric engagement with the first plurality of rings of another fastening unit and mounted together on said hinge pin.

9. A hinge joint assembly according to claim 1 further characterized in that:
(A) said connecting member comprises a first generally cylindrical member having an axis of rotation perpendicular to the longitudinal axis of the structural component,
(B) said intermediate mounting means comprises a U-shaped band of flat rigid material extending around and in rotational circumferential engagement with the cylindrical surface of said cylindrical member for relative rotation about the longitudinal axis of the cylindrical member,
(C) each of the ends of said U-shaped band has an aperture therein, and
(D) said hinge pin extends through said apertures.

10. A hinge joint assembly according to claim 9 further characterized in that:
(A) said first cylindrical member includes a central circumferential concave groove,
(B) a second generally cylindrical spool member having a central circumferential concave groove is disposed in mating surface engagement with said first cylindrical member, the longitudinal axes of said cylindrical members being perpendicularly skew,
(C) said spool member includes an axial pasage, and
(D) said hinge pin extends through said passage.

11. A hinge joint assembly according to claim 9 further characterized in that the ends of the U-shaped band of one fastening unit are in coaxial engagement with the ends of the band of another fastening element and mounted together on said hinge pin.

12. A hinge joint assembly according to claim 9 further characterized in that:
(A) said connecting member includes a cylindrical socket adapted to receive a longitudinally extending rigid structural component for rotation therein,
(B) the axis of said socket is coaxial with the longitudinal axis of said structural component and perpendicular to the longitudinal axes of said first spool and said hinge pin, and
(C) said U-shaped band has a central slot for passage of said structural component into the socket.

13. A hinge joint assembly according to claim 12 further characterized in that said socket is internally threaded.

14. A hinge joint assembly according to claim 9 further characterized in that:
(A) said connecting member includes a cylindrical plug adapted to be received into a cylindrical recess in the end of a longitudinally extending rigid structural component for rotation therein,
(B) the longitudinal axis of said plug is coaxial with the longitudinal axis of said structural component and perpendicular to the longitudinal axes of said first spool and said hinge pin, and
(C) said U-shaped band has a central slot for passage of said plug.

15. A hinge joint assembly according to claim 14 further characterized in that said plug is externally threaded.

* * * * *

UNITED STATES PATENT AND TRADEMARK OFFICE
CERTIFICATE OF CORRECTION

PATENT NO. : 4,111,574
DATED : September 5, 1978
INVENTOR(S) : John F. Runyon

It is certified that error appears in the above-identified patent and that said Letters Patent are hereby corrected as shown below:

Column 3, line 23, "diamter" should be --diameter--.

Column 4, line 64, "busing" should be --bushing--.

Signed and Sealed this

Third Day of April 1979

[SEAL]

Attest:

RUTH C. MASON
Attesting Officer

DONALD W. BANNER
Commissioner of Patents and Trademarks